(No Model.)

3 Sheets—Sheet 1.

H. P. HOLLAND.
ORE SMELTING FURNACE.

No. 551,441.  Patented Dec. 17, 1895.

Witnesses:
Henrietta M. Holland
Hubert S. Bankart

Inventor:
Henry P. Holland

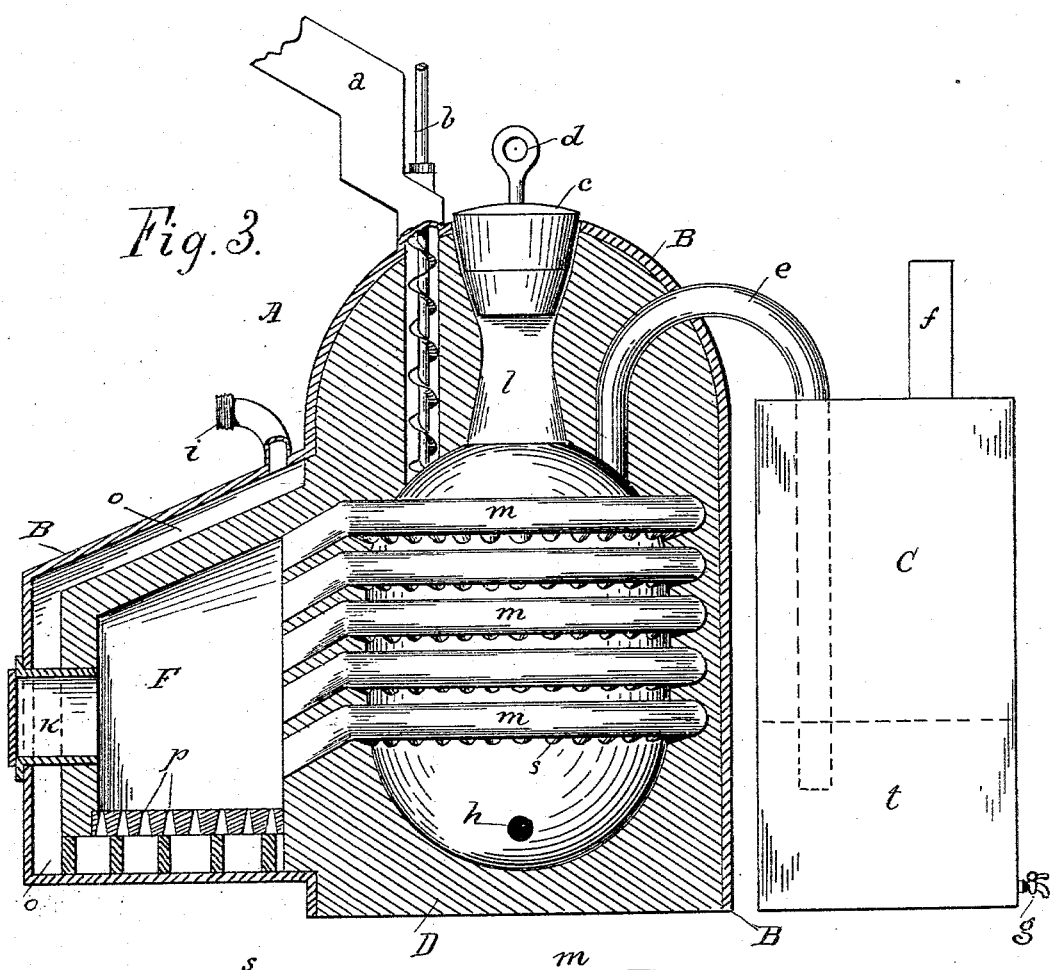

(No Model.) 3 Sheets—Sheet 3.

H. P. HOLLAND.
ORE SMELTING FURNACE.

No. 551,441. Patented Dec. 17, 1895.

Witnesses.
F. Monteverde
George Senn

Inventor:
Henry. P. Holland

UNITED STATES PATENT OFFICE.

HENRY P. HOLLAND, OF SAN FRANCISCO, CALIFORNIA.

ORE-SMELTING FURNACE.

SPECIFICATION forming part of Letters Patent No. 551,441, dated December 17, 1895.

Application filed November 13, 1893. Renewed March 20, 1895. Serial No. 542,550. (No model.)

*To all whom it may concern:*

Be it known that I, HENRY P. HOLLAND, a citizen of the United States, residing at San Francisco, in the county of San Francisco and State of California, have invented certain new and useful Improvements in Ore-Smelting Furnaces, of which the following is a specification.

My invention relates to improvements in furnaces for smelting ores, compressed air being forced through blowpipes in the bottom of the fire-box upon the fire therein from the compressed-air chamber surrounding said fire-box, which is supplied by a pipe from an air-compressor, and entering the top of the air-chamber, the air coming from the blowpipe in the bottom of the fire-box, greatly intensifies the fire and flame in the fire-box. The roasted ore is fed into the smelter through a feeder at the top of the same, being regulated in its supply by a revolving screw. Circling about the inside wall of the smelting-kettle there are flues or pipes in such number as may be desirable, into which the flames are forced from the fire-box through blowpipes or flues, and thence through the blowpipes in said circular flues surrounding the smelting-kettle in and upon the roasted ore in the kettle, quickly reducing it to a molten state, whence it is drawn off through a discharge-hole near the bottom. The gases and ore fumes are conducted off from the smelter into a water-tank, whence after passing through the water the gases are conducted off through the gas-escape pipe at the top of the water-tank. The top of the smelting-kettle is provided with an opening through which the ore may be broken up and removed when frozen and solidified.

The object of my invention is to provide a smelter for the rapid and almost instantaneous smelting of the roasted ore as fast as it is fed into the smelting-kettle by means of the intense heat to which it is subjected, which heat is produced by the compressed air forced through blowpipes upon the fire and flame in the fire-box, and flame and heat by the same pressure is blown through the many blowpipes or flues connecting the fire-box with the circular pipes or flue about the inside of the wall of the smelter-kettle upon the ore coming into the kettle, reducing it at once to molten metal. I attain these objects by the mechanism illustrated by the following drawings.

Figure 1:
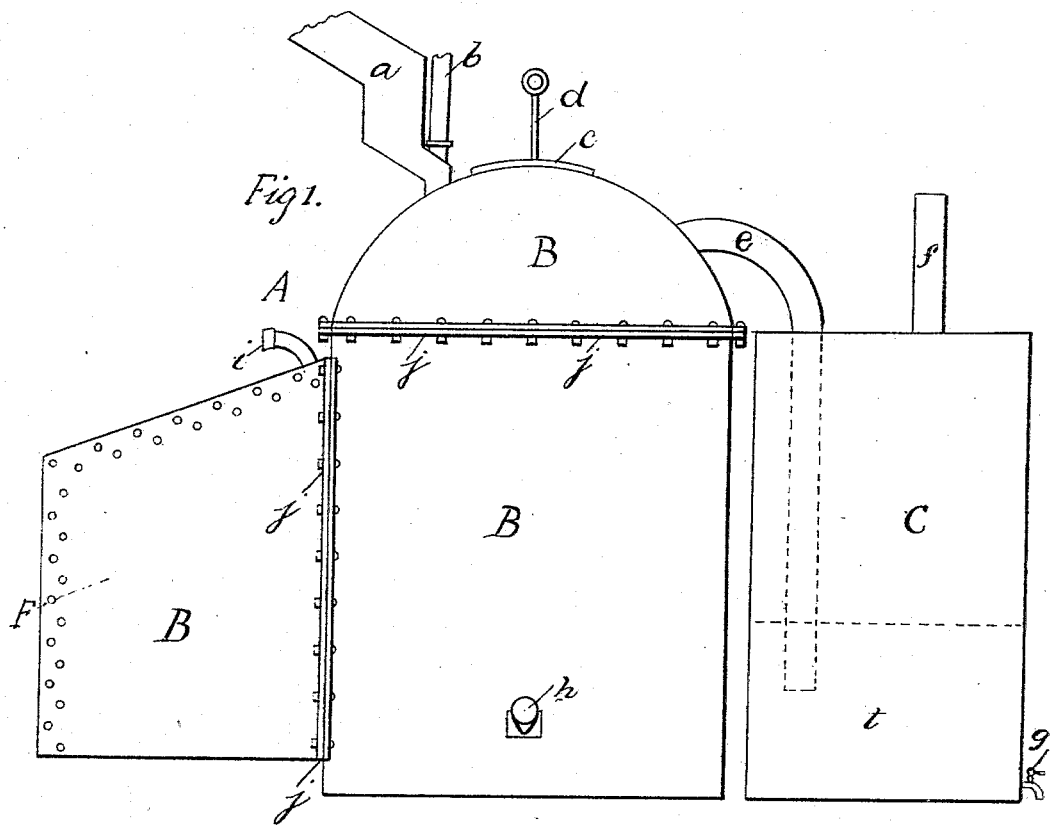
Figure 2:
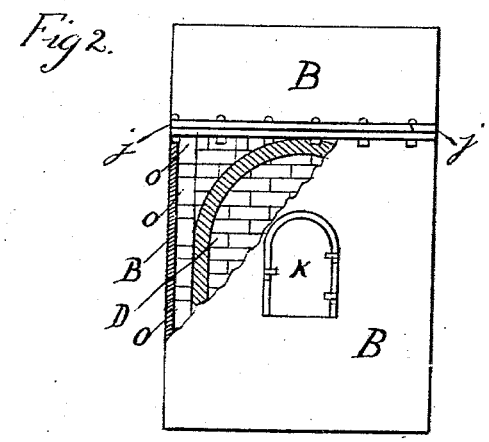
Figure 8:
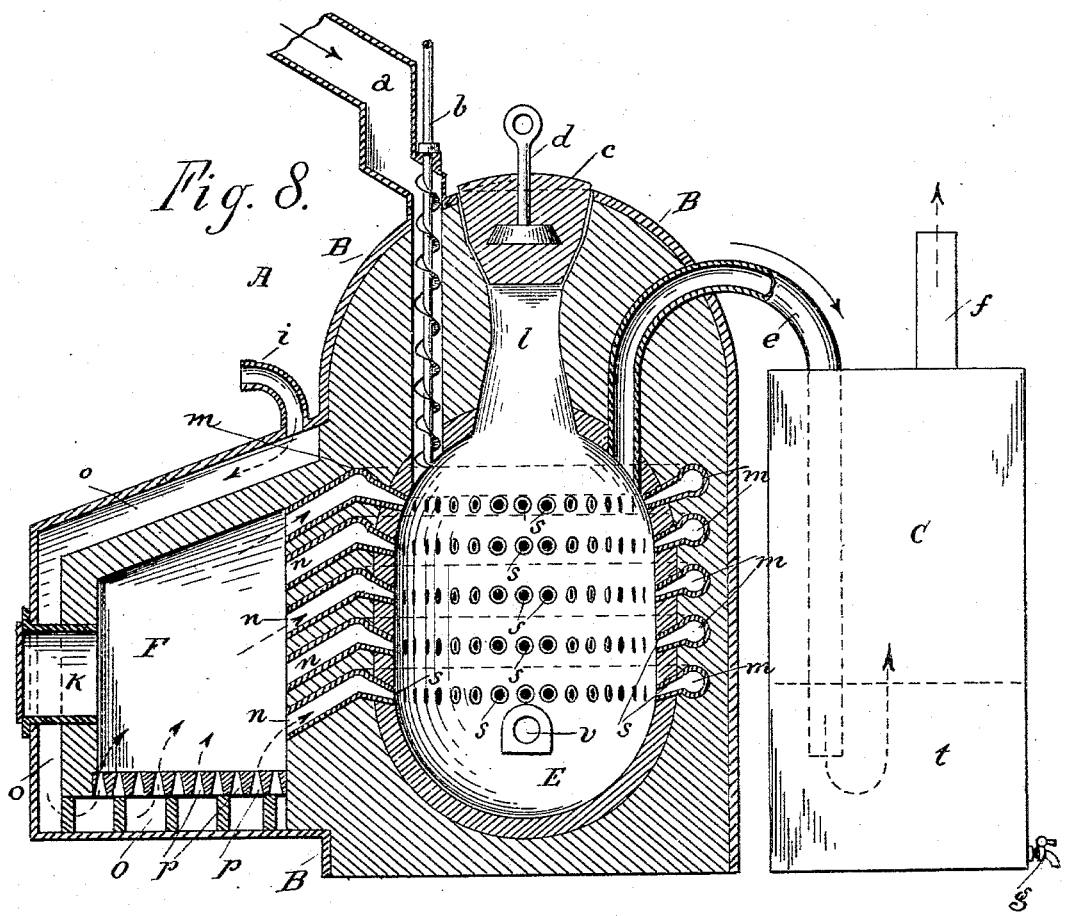
Figure 9:
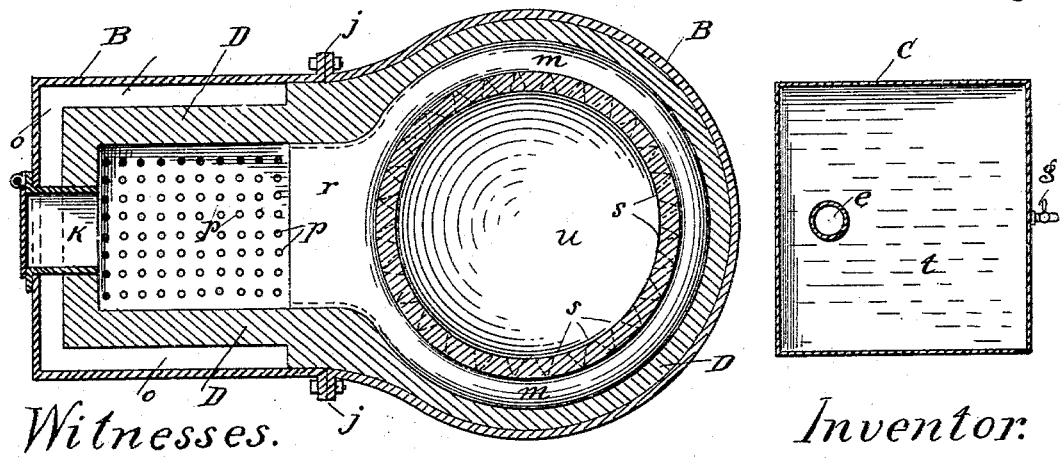

Figure 1 is a perspective view of the smelter as inclosed in its iron casing, showing compressed-air pipe, ore-feeder, feed-regulator, water-tank, the gas and fume pipe connection leading into it from the smelting-kettle, gas-escape, and the metal discharge; Fig. 2, a front view of fire-box with casing broken away, showing brick wall, furnace-door, and location of air-chamber; Fig. 3, a perspective view of the furnace without the iron casings, showing the circular flues about the inside of the smelting-kettle; Fig. 4, a section of circular flue with blowpipe-holes and upper side of blowpipe-flue; Fig. 6, a section of end of a blowpipe; Fig. 7, a half section of upper end of blowpipe; Fig. 8, a view of smelting-furnace with the front wall removed, with water-tank. Fig. 9 is a sectional plan through center of fire-box and furnace, showing the bottom of fire-box and furnace, the blowpipe-holes under fire-box brickwork, the circular flues and space connection between fire and said flues, in which blowpipe fire-flues are located.

A represents the smelter entire; B, the metal casing; C, water-tank; D, brick wall of the furnace; E, the smelting-kettle; F, the fire-box; *a*, ore-feeder; *b*, ore-feed regulator; *c*, plug or stopper, closing the opening in the top of the smelting-kettle; *d*, handle to the same; *e*, pipe conducting gas and ore fumes from the smelting-kettle to the water-tank; *g*, faucet for carrying off the water from the tank; *h*, discharge-hole for drawing off the metal from the kettle in its molten state; *i*, compressed air-pipe conducting compressed air into the air-chamber about the fire-box; *j*, casing-joints; *k*, furnace-door; *l*, opening in the top of the smelting-kettle, through which the ore when frozen or solidified may be broken up and removed; *m*, circular flues in the walls of the smelting-kettle; *n*, blowpipe fire-flues connecting the fire-box with the circular flues; *o*, compressed-air chamber about the fire-box; *p*, blowpipe-holes in the bottom of the fire-box; *s*, blowpipe-holes in the circular flues; *t*, water in tank; *u*, bottom of the smelting-kettle; $v$, discharge-hole in the back of the kettle for drawing off the slag; $r$, upper side of blowpipe fire-flue.

What I claim as my invention, and desire to secure by Letters Patent of the United States, is—

1. A blow pipe ore smelting furnace consisting of the walls, D; the metallic casing, B, inclosing said walls; the casing joints, $j$, uniting the casing of the firebox and the furnace; the fire box, F; the compressed air pipe, $i$, conducting compressed air from an air compressor to the air chamber about the fire box; the air chamber, $o$, between the walls about the fire box for receiving the air from the air compressor through the pipe, $i$; the blow pipe holes, $p$, in the bottom of the fire box connecting the air chamber with the firebox for blowing the fires therein; the blow pipe heat and flame flues, $n$, connecting with the fire box; $m$, the circular flues about the kettle, through which heat and flame are forced upon the roasted ore in the kettle; the blow pipe holes, $s$, in the circular flues entering the kettle; the smelting kettle, E, in which the roasted ore is smelted; the discharge hole, $h$, for drawing off the molten metal; the discharge hole, $v$, in the back of the kettle for drawing off the slag; the opening, $l$, in the top of the kettle, through which the ore when frozen or solidified may be broken up or removed; the plug or stopper, $c$, for tightly closing up said opening; the handle, $d$, to said plug or stopper; the ore feeder, $a$, through which the ore is fed into the kettle; the ore feed regulator, $b$, for regulating the supply of the ore passing into the kettle; the gas and fume pipe, $e$, for conducting ore fumes from the smelting kettle to the water tank; the water tank, C, into which the gas and fumes pass; the faucet, $g$, for drawing off the water from the tank; the gas escape pipe, $f$; and the furnace door, $k$; substantially as herein described and set forth.

2. In a blow pipe smelting furnace the combination of the compressed air pipe, $i$, conducting compressed air to the air chamber; the air chamber, $o$, between the walls of the firebox; the blow pipe holes, $p$, in the bottom of the firebox; with the firebox, F; the blow pipe heat and flame flues, $n$; the circular heat and flame flues, $m$, in the wall of the smelting kettle encircling the same; the blow pipe holes, $s$, in the circular flues, through which heat and flame are forced upon the roasted ore in the smelting kettle; the smelting kettle, E; the discharge hole, $h$, for drawing off the molten metal; the discharge hole, $v$, for drawing off the slag; the opening, $l$, in the top of the kettle through which the ore when frozen or solidified may be broken up or removed; the plug or stopper, $c$, for closing said opening; the handle, $d$; the ore feed or chute, $a$; the ore feed regulator, $b$; the gas and fume pipe, $e$, for conducting the gas and ore fumes from the smelting kettle to the water tank; the water tank, C; the gas escape pipe, $f$; the faucet, $g$; and the furnace door, $k$; substantially as herein described and set forth.

3. In a blowpipe ore smelting furnace, the combination of the metallic casing, B, surrounding the furnace walls; the walls, D; the ore feeder, $a$; the ore regulator, $b$; the smelting kettle, E, having the mouth or opening in the top, $l$; the plug or stopper, $c$; the discharge holes, $h$ and $v$, for drawing off the molten metal and slag; with the gas and fume pipe, $e$; the water tank, C; the gas escape pipe, $f$; the compressed air pipe, $i$; the air chamber, $o$; the blow pipe holes, $p$, in the bottom of the firebox; the firebox, F; the blow pipe heat and flame flues, $n$, connecting the fire box and the circular heat and flame flues; the circular heat and flame flues, $m$; and the blow pipe holes, $s$, in the circular flues substantially as herein described and set forth.

4. In a blow pipe ore smelting furnace, the combination of the blow pipe heat and flame flues, $n$; the circular heat and flame flues, $m$; the blow pipe holes, $s$, as connected with the fire box, F; blow pipe holes, $p$; compressed air chamber, $o$; and the compressed air pipe, $i$; with the smelting kettle, E; the opening, $l$; the stopper, $c$, having handle, $d$; the gas and fume pipe, $e$; the water tank, C; the gas escape pipe, $f$; the ore feeder, $a$; the ore regulator, $b$; the walls of the furnace, D; and the metallic casing, B; substantially as herein described and set forth.

5. In a blow pipe ore smelting furnace, the compressed air chamber, $o$, having the compressed air pipe, $i$, through which compressed air is forced into said air chamber, in combination with the kettle, E, connected with said air chamber by the blow pipe holes, $p$, the firebox, F; the heat and flame flues, $n$; the circular heat and flame flues, $m$; the blow pipe holes, $s$, and having opening, $l$; stopper, $c$, having handle, $d$; discharge hole, $h$, for draining off the molten ore, and discharge hole, $v$, for draining off the slag, and in combination in connection with said kettle, the gas and fume pipe, $e$; the water tank, C; the gas escape pipe, $f$; faucet, $g$; ore feeder, $a$; and ore feed regulator, $b$; substantially as herein described and set forth.

HENRY P. HOLLAND.

Witnesses:
HUBERT BANKART,
NORMAN H. HURD.